(12) United States Patent
Gocmen et al.

(10) Patent No.: US 11,386,810 B2
(45) Date of Patent: Jul. 12, 2022

(54) NECK MODEL WHERE NECK INJURIES CAN BE EXAMINED

(71) Applicants: Ulas Gocmen, Ankara (TR); Mustafa Ilhan Gokler, Ankara (TR); Volkan Esat, Guzelyurt (CY)

(72) Inventors: Ulas Gocmen, Ankara (TR); Mustafa Ilhan Gokler, Ankara (TR); Volkan Esat, Guzelyurt (CY)

( * ) Notice: Subject to any disclaimer, the term of this patent is extended or adjusted under 35 U.S.C. 154(b) by 331 days.

(21) Appl. No.: 16/636,653

(22) PCT Filed: Dec. 25, 2018

(86) PCT No.: PCT/TR2018/050887
§ 371 (c)(1),
(2) Date: Feb. 5, 2020

(87) PCT Pub. No.: WO2019/194778
PCT Pub. Date: Oct. 10, 2019

(65) Prior Publication Data
US 2021/0150936 A1    May 20, 2021

(30) Foreign Application Priority Data
Dec. 29, 2017   (TR) .................................. 2017/22966

(51) Int. Cl.
*G09B 23/30* (2006.01)
*G01M 7/08* (2006.01)
*G01M 17/00* (2006.01)

(52) U.S. Cl.
CPC ............... *G09B 23/30* (2013.01); *G01M 7/08* (2013.01); *G01M 17/00* (2013.01)

(58) Field of Classification Search
CPC ...... G09B 23/28; G09B 23/30; G09B 23/303; G09B 23/306; G09B 23/34
See application file for complete search history.

(56) References Cited

U.S. PATENT DOCUMENTS

| 2,197,975 | A | * | 4/1940 | Fleet | ...................... G09B 23/32 434/274 |
| 3,962,801 | A | * | 6/1976 | Gonzalez | ............... G09B 23/32 434/274 |
| 5,259,765 | A | | 11/1993 | Richards | |
| 9,011,158 | B2 | | 4/2015 | Merkle et al. | |

(Continued)

FOREIGN PATENT DOCUMENTS

| CN | 103926046 A | 7/2014 | |
| DE | 10215640 A1 | * 11/2003 | .............. G09B 23/32 |

OTHER PUBLICATIONS

THOR-M Parts Catalog, Humanetics Innovative Solutions, Inc., Nov. 8, 2017, pp. 6-7.

(Continued)

*Primary Examiner* — Robert J Utama
(74) *Attorney, Agent, or Firm* — Bayramoglu Law Offices LLC

(57) ABSTRACT

A new physical neck model where all neck injuries and particularly the "whiplash" neck injuries can be examined for "adult crash test dummies" used in vehicle crash tests in the vehicle safety field includes a number of connection interface components, five intervertebral discs, seven vertebrae, four muscle interfaces, and at least one sensor set.

37 Claims, 14 Drawing Sheets

(56) References Cited

U.S. PATENT DOCUMENTS

| | | | | |
|---|---|---|---|---|
| 2005/0106545 | A1* | 5/2005 | Heruth | G09B 23/30 434/267 |
| 2011/0319745 | A1* | 12/2011 | Frey | A61B 17/15 600/407 |
| 2013/0025220 | A1 | 1/2013 | Yu et al. | |
| 2013/0131486 | A1* | 5/2013 | Copf | G09B 23/30 600/407 |
| 2013/0252220 | A1* | 9/2013 | Wang | G09B 23/32 434/274 |
| 2014/0220530 | A1 | 8/2014 | Merkle et al. | |
| 2017/0249870 | A1* | 8/2017 | Shah | G09B 23/32 |

OTHER PUBLICATIONS

Manohar M. Panjabi, et al., Quantitative Anatomy of Cervical Spine Ligaments. Part I. Upper Cervical Spine, Journal of Spinal Disorders, 1991, pp. 270-276, vol. 4. No. 3.

Manohar M. Panjabi, et al., Quantitative Anatomy of Cervical Spine Ligaments. Part II. Middle and Lower Cervical Spine, Journal of Spinal Disorders, 1991, pp. 277-285, vol. 4, No. 3.

Jonas Osth, et al., A Female Ligamentous Cervical Spine Finite Element Model Validated for Physiological Loads, Journal of Biomechanical Engineering, 2016, pp. 061005-1-061005-9, vol. 138.

Jennifer Adrienne Dewit, Cervical Spine Segment Modeling at Traumatic Loading Levels for Injury Prediction, A thesis presented to the University of Waterloo in fulfilment of the thesis requirement for the degree of Master of Applied Science in Mechanical Engineering, 2012, pp. 1-122.

Stephen Mattucci, Strain Rate Dependent Properties of Younger Human Cervical Spine Ligaments, A thesis presented to the University of Waterloo in fulfillment of the thesis requirement for the degree of Master of Applied Science in Mechanical Engineering, 2011, pp. 1-202.

Jeffery Matthew Barrett, An EMG-Driven Cervical Spine Model for the Investigation of Joint Kinetics: With Application to a Helicopter Pilot Population, A thesis presented to the University of Waterloo in fulfillment of the thesis requirement for the degree of Master of Science in Kinesiology, 2016, pp. 1-216.

Matthew Brian Panzer, Numerical Modelling of the Human Cervical Spine in Frontal Impact, A thesis presented to the University of Waterloo in fulfillment of the thesis requirement for the degree of Master of Applied Science in Mechanical Engineering, 2006, pp. 1-248.

* cited by examiner

NECK MODEL WHERE NECK INJURIES CAN BE EXAMINED

CROSS REFERENCE TO THE RELATED APPLICATIONS

This application is the national phase entry of the International Application No. PCT/TR2018/050887, filed on Dec. 25, 2018, which is based upon and claims priority to Turkish Patent Application No. 2017/22966, filed on Dec. 29, 2017, the entire contents of which are incorporated herein by reference.

TECHNICAL FIELD

The invention subject matter of the application is related to a new physical neck model for "adult crash test dummies" used in vehicle crash tests in the vehicle safety field where all neck injuries, particularly the "whiplash" neck injuries can be examined.

BACKGROUND

Considering the vehicle safety industry, it is seen that crash test dummies are categorized into three as frontal, rear and side crash test dummies with respect to direction of the crash. In each crash direction, there is more than one type of crash test dummies. The reason why there are a variety of crash test dummies for each crash direction is that test requirements change depending on the test regulations where the dummies are used and to the injury zone to be examined in the test. Among the dummies on which the "whiplash" and other neck injuries in the context of this invention are most intensively examined are Hybrid III series frontal crash test dummies and the BioRID II rear crash test dummy. However, even these most commonly used dummies fall short in some areas with respect to "whiplash" and other neck injuries.

Hybrid III series dummies have been used in previous scientific researches for "whiplash" injury and it was seen that all dummy necks in Hybrid III series fall short for examination of "whiplash" injuries since the necks are very stiff when compared to real human neck behavior. Moreover, the neck models used in these dummies are very simple in terms of model detail and material when compared to the human neck.

The rear crash dummy called BioRID II is a dummy specifically designed for "whiplash" injury. However, the first disadvantage of this dummy is that it is designed only for crash loads from rear and another disadvantage is that it is not designed for high speed impacts where "whiplash" injury occurs in significant rates. Depending on the previous scientific studies and the information gathered from dummy manufacturers, in cases where the speed is high and the direction of crash is not from rear, it is known that the dummy neck does not provide accurate results and the neck may get damaged.

Besides Hybrid III and BioRID II dummies, there is also another frontal crash test dummy named THOR-50M of which the validation studies are undergoing and that is expected to be included in various test regulations in 2020s. This dummy is a 50th percentile sized dummy that is developed over the Hybrid III series 50th percentile crash test dummy. The neck structure of this dummy is also simple when compared to human neck structure both in terms of geometry and variety of elements. There are 7 vertebrae and 5 intervertebral discs in human neck. In the neck model of the THOR-50M crash test dummy, unlike the human neck, there are only six vertebrae as shown in FIG. 23. These vertebrae are made of aluminum material. However, the vertebrae are geometrically formed as simple discs and they don't possess a similarity with the human vertebral geometry. The intervertebral discs in the THOR-50M Crash Test Dummy (FIG. 24) are designed to be as 5 pieces as in the human neck. The discs are dimensionally different as compared to human intervertebral discs. In the THOR-50M Crash Test Dummy neck model, "ligament" structures of the human neck are not present. Moreover, the low friction joints named "facet joints" are not present in the neck model of the THOR-50M Crash Test Dummy. The muscles in the human body are modeled as three steel ropes in the THOR-50M Crash Test Dummy neck model as seen in FIG. 25. The stiffness of the neck can be adjusted by setting the tension of related steel ropes.

All the neck models of the other adult crash test dummies except these most developed and commonly used 3 dummies are simpler derivatives of Hybrid III series, BioRID II and THOR-50M dummy necks. In general, all these other dummy neck models are simpler than the human neck in terms of model detail and material.

The neck models that are closest to the physical neck model of this invention and that are approved by the test regulations are Hybrid III series and BioRID II dummy necks as mentioned above. The difference between the physical neck model of the invention and those dummies are described below in more detail. The neck of the mid-sized dummy called "Hybrid III series $50^{th}$ percentile test dummy" are used in the illustrations as an example while describing the differences of the proposed neck model with Hybrid III series necks. However, the physical neck model provided in the context of this invention can be adapted to all adult test dummies used in vehicle crash tests by scaling the neck model with respect to the related dummy and by changing the connection interface parts where the neck model is connected to the body of the dummy.

The neck structure of "Hybrid III series $50^{th}$ percentile crash test dummy" (herein after called as Hybrid III) shown in FIG. 16 is simpler when compared to human neck structure in terms of both geometry and variety of elements. While there are 7 vertebrae in the neck region of a human, there are only a total of 5 vertebrae in the Hybrid III neck model as shown in FIG. 17 as opposed to human neck. These vertebrae are made of aluminum material. However, the vertebrae are shaped as simple discs and they are not similar to human vertebral geometry. The intervertebral discs in the test dummy (FIG. 18) are designed to have only 4 as opposed to human neck where there are 5 intervertebral discs. The discs are way bigger than the human intervertebral discs. The neck model does not have the "ligament" structures and the "facet joints" of the human neck. The muscles that are present in the human neck are modeled as a steel rope in the neck model of Hybrid III test dummy as shown in FIG. 16. The tension of the related steel rope is controlled by adjusting the tightness of the nut thereon and the stiffness of the neck is adjusted by this steel rope.

BioRID II test dummy is a dummy that is developed especially for low speed rear crash tests. This dummy has a more detailed neck model when compared to Hybrid III dummies. However, even this more detailed neck model is still simpler than both the human neck and the neck model of this invention. Another disadvantage of the neck model of the BioRID II dummy is that it can only be used for rear crash tests. Using it for frontal or side crash tests damages the neck of the dummy. In the BioRID II test dummy neck model, as shown in FIG. 19, there are a total of 7 vertebrae as in humans. Even though the number of vertebrae is the same, the vertebrae have geometrically simpler shapes and they are not similar to human vertebral geometry. These geometric differences are highest at the first and second vertebrae. There are no intervertebral discs between the vertebrae of the test dummy that are present in the human neck. There are only some small non-metallic components that are placed between the vertebrae to limit the motion of the vertebrae relative to each other. As shown in FIG. 20, the vertebrae are connected to each other by metal pins. The structure used in connection of the vertebrae is very different from the human and inventive model in terms of both the method of connection and the geometry of the connection components. In the BioRID II crash test dummy neck model, the "ligament" structures and the "facet joints" of the human neck are not present. The muscles of the human neck are modeled as 4 thin steel ropes in the BioRID II crash test neck model as seen in FIG. 21. The stiffness of the neck can be adjusted by adjusting the tension of the related steel ropes.

Related to the subject, the patent application Numbered US 2013025220 A1 has been observed. Said patent application is related to crash test dummies (ATD). More specifically, a support spine with adjustable curvature is used to estimate injuries and traumas in vehicle collisions. The flexible supporting spine mechanism contains a number of discs. The intervertebral discs are positioned between the spine discs. The flexible support spine structure is arranged inside the neck region.

The assembly interfaces between the physical neck model of the invention and the patent Numbered US 20130252220 A1 are different. Unlike said patent, the physical neck model of the invention is designed to be installed directly on the Hybrid III series $50^{th}$ percentile crash test dummy by using 8 screws. Additionally, it can be adapted to all adult test dummies used in vehicle crash tests by scaling the model dimensions with respect to the related dummy and by changing the connection interface parts where the neck model is connected to the body of the dummy. When compared to human neck, in the patent model Numbered 20130252220 A1, the "ligament" structures, "facet joints" and the muscles are not present, but they are present in the physical neck model of the invention. The physical neck model of the invention is more realistic and detailed in terms of similarity to humans. In contrast to the physical neck model of the invention, the neck model defined in said patent can't be used in "whiplash" neck injury tests due to the reasons described above.

Related to the subject, the U.S. Pat. No. 9,011,158 B2 is related to a human supporting neck model having human-like material and mechanical properties. It is used in vehicle crash tests. There are spine and intervertebral discs. These discs are made of polymeric material.

The model defined in U.S. Pat. No. 9,011,158 B2 is an independent neck model and it is not used for observing the relative motions between the neck and the human body during collision. However, since the physical neck model of the invention can be used by being installed on all currently available adult crash test dummies, it is possible to observe the relative motions between the neck and the human body. Thus, the model in the U.S. Pat. No. 9,011,158 B2 can't be used in dynamic test such as crash tests. When compared to human neck, in the patent model Numbered U.S. Pat. No. 9,011,158 B2, the "ligament" structures and "facet joints" are not present, but they are present in the physical neck model of the invention. The physical neck model of the invention is more realistic and detailed in terms of similarity to humans. In contrast to the physical neck model of the invention, the neck model defined in said patent can't be used in "whiplash" neck injury tests due to the reasons described above.

The U.S. Pat. No. 5,259,765 A describes study of neck injuries by using Hybrid III series $50^{th}$ percentile crash test dummy in vehicle crash tests as a result of negative and positive accelerations.

In U.S. Pat. No. 5,259,765 A, a new neck model has been suggested that can be used in vertical launch tests where other available neck models fall short by that time. This patent is very different than the new suggested neck model other than the fact that they are both neck models. The model presented in the U.S. Pat. No. 5,259,765 A is much simpler than the new suggested model since it is incompatible with the real human neck, it does not have the natural neck angles and C shape, it can't be implemented to real dummies, it has a very stiff structure for "whiplash" neck injuries etc.

The patent application numbered CN 103926046 A describes a crash test dummy neck structure which reflects the mechanical properties of the human neck and it is used in vehicle safety. The neck structure of the crash dummy consists of the muscle fixation module and the muscle module. The muscle fixation module consists of an upper neck collar, a bottom neck collar and shoulder rings.

In the patent application numbered CN 103926046 A, only a number of pulling springs are added onto a neck model that is very similar to the neck of the Hybrid III series $50^{th}$ percentile crash test dummy. The differences mentioned for other patents are also valid for this neck model. It is much simpler than the new suggested model since it is incompatible with the real human neck, it does not have the natural neck angles and C shape, it can't be implemented to real dummies, it has a very stiff structure for "whiplash" neck injuries etc.

SUMMARY

The invention subject matter of the application is related to a new physical neck model where neck injuries can be examined for adult crash test dummies used in vehicle crash tests in the vehicle safety field. There are several sensors in the crash test dummies used in these tests. During a crash test, the data is collected by those sensors, the collected data is evaluated and it is determined how safe and/or compliant the whole tested vehicle or a part of it with reference to defined standards.

Within the scope of the invention, a new physical neck model is designed that can be implemented to many different adult crash test dummies used in frontal, rear and side crash tests. The designed model can be implemented to frontal, rear and side adult crash test dummies by only scaling the model dimension and by changing the connection interfaces. Thus, the invention is a physical neck model that can be implemented to adult crash test dummies of all dimensions used in crash tests from all directions. However, in the illustrations given in the invention, a new neck model is shown where neck injuries can be examined for the Hybrid III $50^{th}$ percentile crash test dummy which is the most commonly used dummy as standard all over the world for frontal crash tests.

BRIEF DESCRIPTION OF THE DRAWINGS

The figures prepared for providing a better understanding of the new neck model where the neck injuries can be examined for adult crash test dummies developed by this invention are described below.

Figure 1:
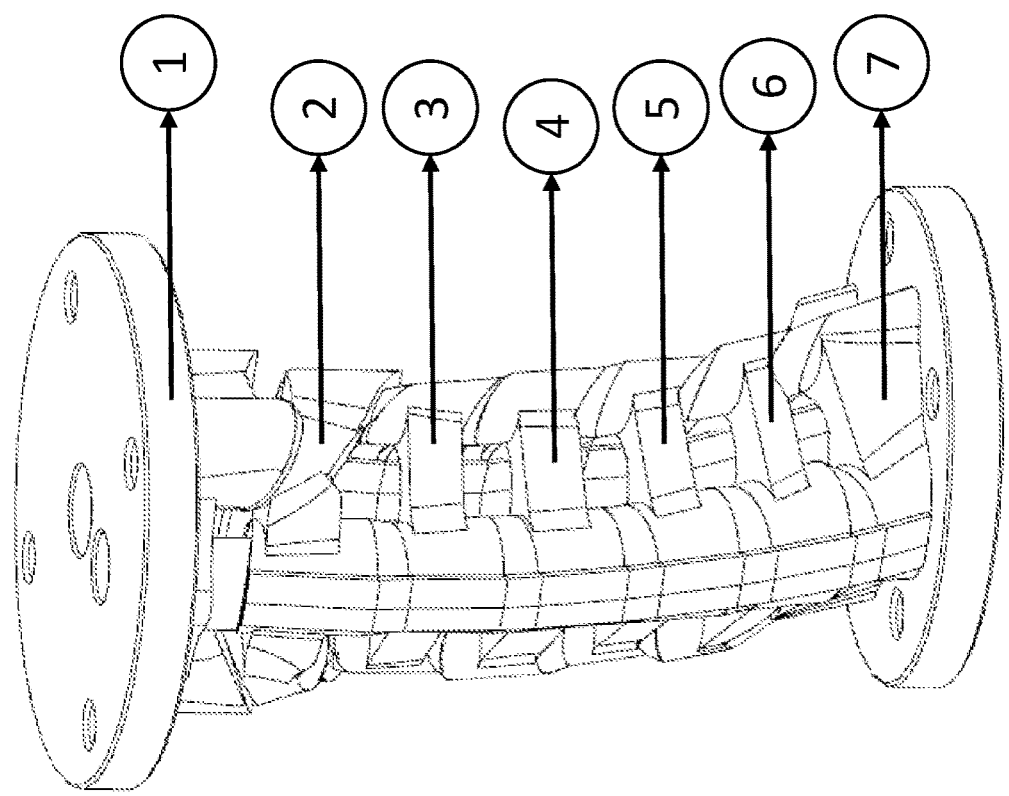
FIG. 1 shows a vertebrae of the neck model of the invention

The parts and components in the figures are given individual reference numbers in order to provide a better understanding of the new neck model developed by this invention where the neck injuries can be examined for adult crash test dummies and each number refers to:

1. Vertebra 1
2. Vertebra 2
3. Vertebra 3
4. Vertebra 4
5. Vertebra 5
6. Vertebra 6
7. Vertebra 7
8. Intervertebral disc 1
9. Intervertebral disc 2
10. Intervertebral disc 3
11. Intervertebral disc 4
12. Intervertebral disc 5
13. AAAM ligament (Anterior atlanto-axial membrane)
14. CL ligament (Capsular ligament)
15. PAAM ligament (Posterior atlanto-axial membrane)
16. TL ligament (Transverse ligament)
17. ALL ligament (Anterior longitudinal ligament)
18. LF ligament (Ligamenta flava)
19. PLL ligament (Posterior longitudinal ligament)
20. ISL ligament (Interspinous ligament)
21. Muscle interface 1
22. Muscle interface 2
23. Left muscle interface
24. Connection interface components
26. Ligaments between Vertebra 2-Vertebra 7
28. Right muscle interface
29. Neck model
30. Steel rope (Prior Art)
31. Intervertebral plastic parts (Prior Art)
32. Metal pins (Prior Art)
33. Vertebrae (Prior Art)
34. Discs (Prior Art)
35. Sensor set
36. Angular Rate Sensor
37. X axis accelerometer
38. Z axis accelerometer

DETAILED DESCRIPTION OF EMBODIMENTS

The invention is related to a new physical neck model (29) where all neck injuries, particularly the "whiplash" neck injuries can be examined for "adult crash test dummies" used in vehicle crash tests in the vehicle safety field.

FIG. 1 shows the vertebrae of the neck model (29). In the neck model (29), there are a total of 7 vertebrae (1-7) as in the human vertebrae. The vertebrae geometries are very close to the human vertebrae geometries since the vertebrae (1-7) in the neck model (29) of the invention are modeled over the scanned human cadaver data. This is same for all vertebrae starting from the first vertebra (1) to seventh vertebra (7). AL 5083 H111 forged aluminum material is used for the vertebrae (1-7). EA55RS forged magnesium material is used as an alternative.

Figure 2:
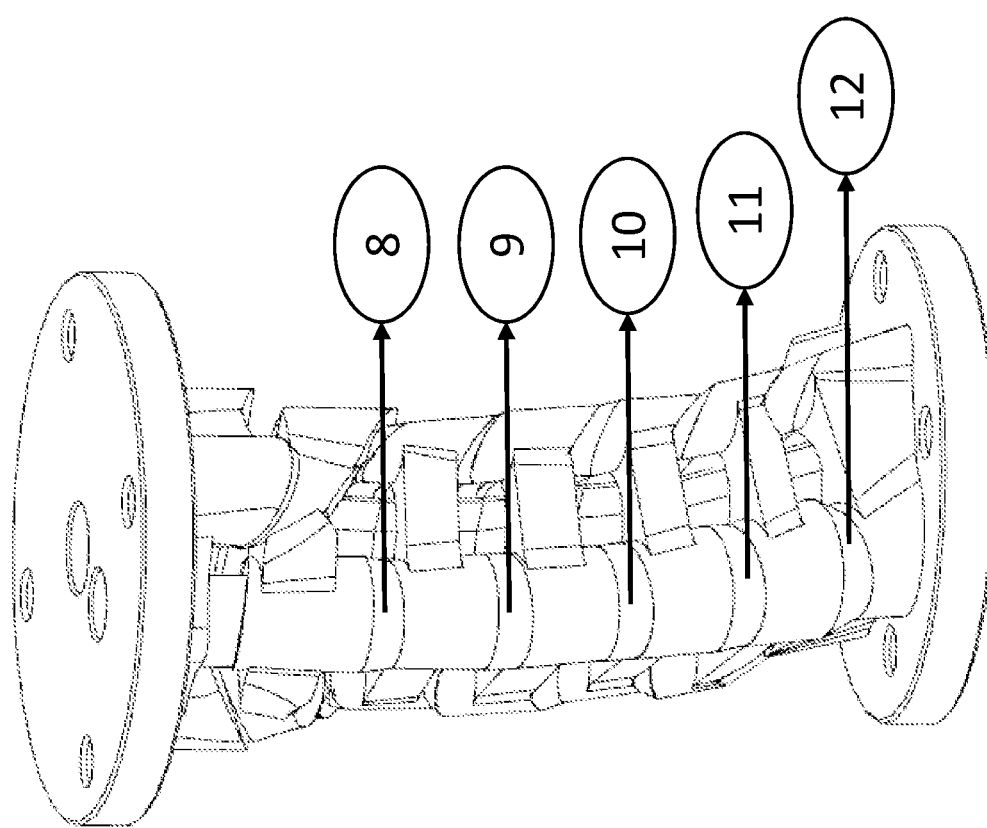
FIG. 2 shows intervertebral discs of the neck model of the invention
Figure 5:
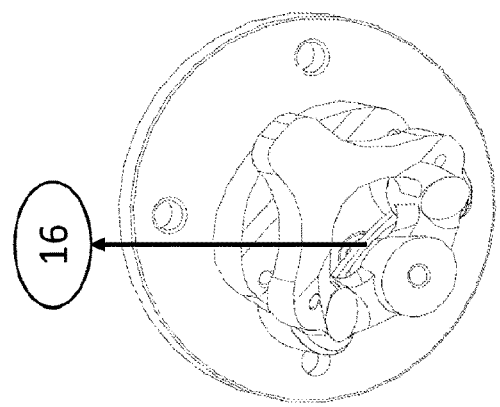
FIG. 5 shows a three-dimensional view of the neck ligaments between the first and second vertebrae of the neck model of the invention
Figure 4:
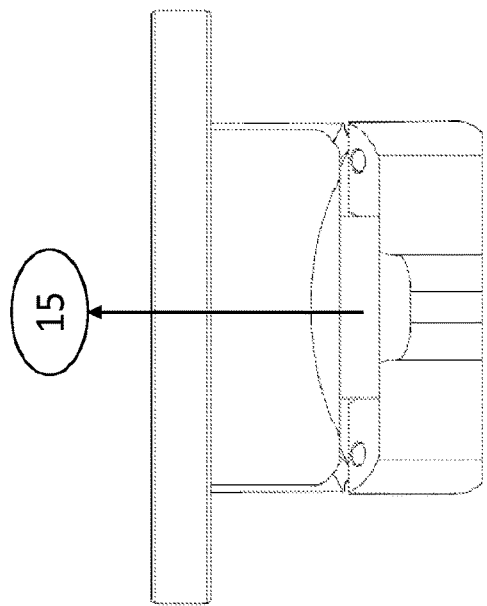
FIG. 4 shows a rear view of the neck ligaments between the first and second vertebrae of the neck model of the invention
Figure 3:
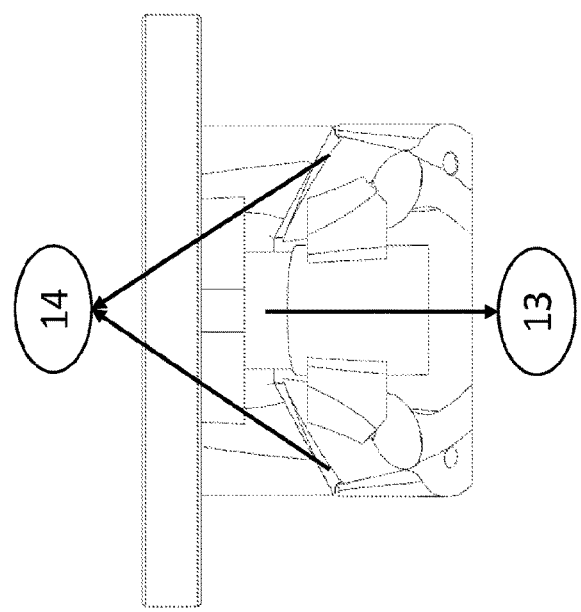
FIG. 3 shows a front view of the neck ligaments between the first and second vertebrae of the neck model of the invention
Figure 6:
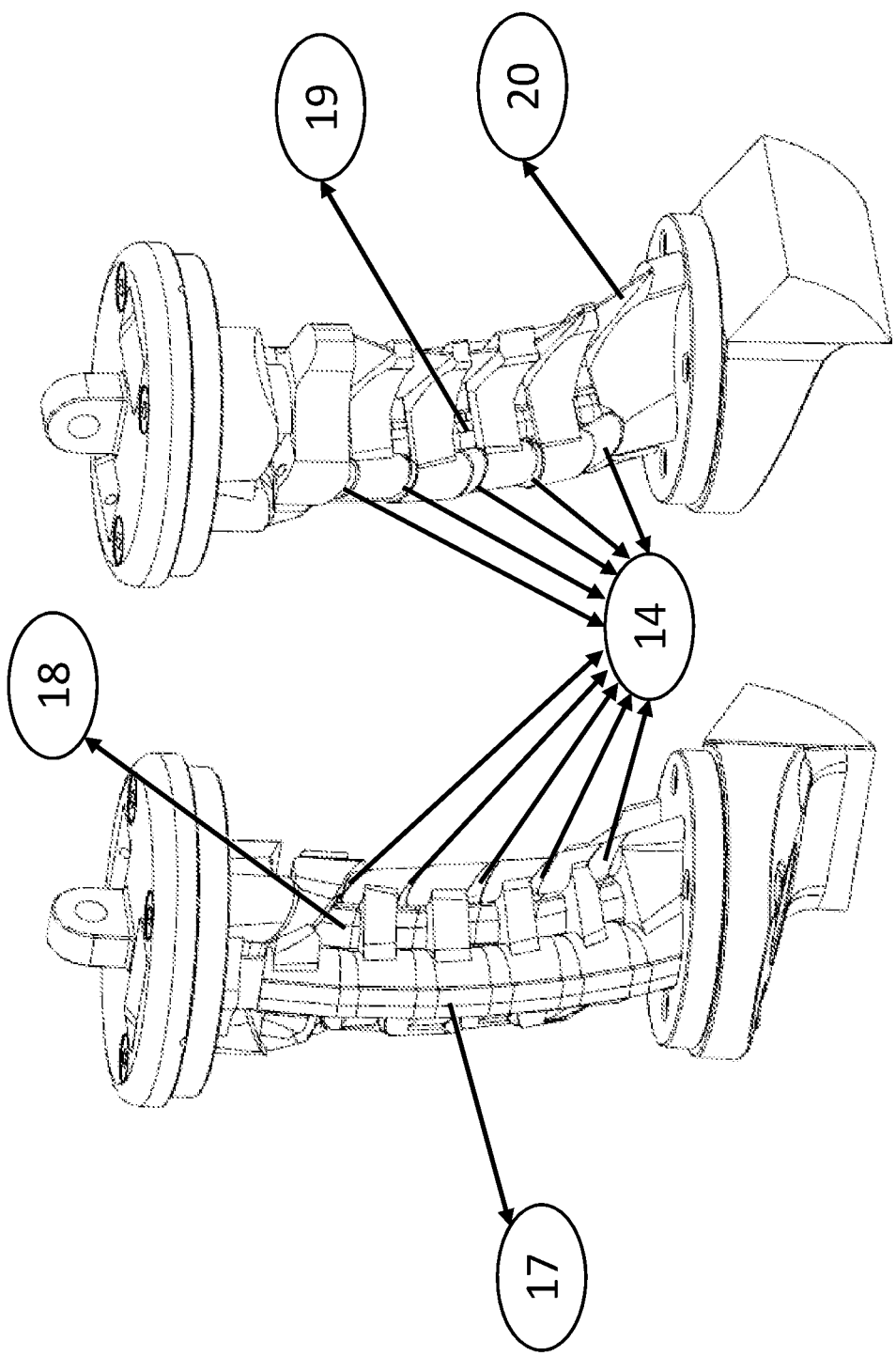
FIG. 6 shows neck ligaments between the third and seventh vertebrae of the neck model of the invention

FIG. 2 shows the intervertebral discs (8-12) of the neck model (29). The 5 intervertebral discs (8-12) used in the neck model (29) of the invention are modeled over the data present in the literature and the currently scanned vertebral data. During modeling of the discs (8-12), a disc is not positioned between the first and second neck vertebrae (1 and 2) and discs (8-12) are positioned between other vertebrae (3-7) as in the human body. Butyl/halo butyl rubber (IIR—Isobutylene isoprene rubber, 30-50% carbon black) material is used for the intervertebral discs (8-12). Alternatively, natural rubber (15-42% carbon black) material is used. In the neck model (29) of the invention, the "ligament" structures (13-20 and 26) (i.e. the connective tissues) in the humans are modeled. During said modeling, modeling is performed over the data present in the literature and the currently scanned vertebral data. The ligaments in the neck model are shown in detail in FIGS. 3-6. As in humans, the "facet joints" are present in the model of the invention. In FIGS. 3 and 6, the internal structure of the capsular ligaments that are shown as CL connective tissue (14) forms the "facet joints".

Silicon (VMQ—Vinyl Methyl Silicon, heat cured) material and alternatively butyl/halo butyl rubber (IIR—Isobutylene isoprene rubber, 30-50% carbon black) material is used for ALL connective tissue (17) located at the bottom neck. Silicon (VMQ—Vinyl Methyl Silicon, heat cured) material and alternatively fluorosilicon (FVMQ—Fluorosilicon, heat cured) material is used for PLL connective tissue (19) located at the bottom neck. Silicon (VMQ—Vinyl Methyl Silicon, heat cured) material and alternatively butyl/halo butyl rubber (IIR—Isobutylene isoprene rubber, 30-50% carbon black) material is used for LF connective tissue (18) located at the bottom neck. Butyl/halo butyl rubber (IIR—Isobutylene isoprene rubber, non-reinforced) material and alternatively Acrylic Rubber (ACM, 30-40% carbon black) is used for ISL connective tissue (20) located at the bottom neck. Silicon (VMQ—Vinyl Methyl Silicon, heat cured) material and alternatively fluorosilicon (FVMQ—Fluorosilicon, heat cured) material is used for CL connective tissue (14) located at the bottom neck. Butyl/halo butyl rubber (IIR—Isobutylene isoprene rubber, non-reinforced) material and alternatively Acrylic Rubber (ACM, 30-40% carbon black) is used for AAAM connective tissue (13) located at the upper neck. Butyl/halo butyl rubber (IIR—Isobutylene isoprene rubber, non-reinforced) material and alternatively silicon (VMQ—Vinyl Methyl Silicon, heat cured, low hardness) is used for PAAM connective tissue (15) located at the upper neck. Silicon (VMQ—Vinyl Methyl Silicon, heat cured) and alternatively fluorosilicon (FVMQ, heat cured) is used for TL connective tissue (16) located at the upper neck. Butyl/halo butyl rubber (IIR—Isobutylene isoprene rubber, non-reinforced) material and alternatively SIS (hardness shore A45) is used for CL connective tissue (14) located at the upper neck. Steel ropes and alternatively high stiffness nylon ropes, rubber, composite rods are used for muscles.

The positions of the connective tissues are as described below:
AAAM ligament (13) is positioned to provide connection between the front bottom-top surfaces of C1 and C2 vertebrae.
CL ligament (14) is positioned to provide connection between the bottom-top surfaces of the right and left parts of the consecutive vertebrae in all C1-C7 vertebrae.
PAAM ligament (15) is positioned to provide connection between the rear bottom-top surfaces of C1 and C2 vertebrae.
TL ligament (16) is positioned to provide connection between the front inner surfaces of C1 and C2 vertebrae.
ALL ligament (17) is positioned to provide connection between the front surfaces of all C2-C7 vertebrae.
LF ligament (18) is positioned to provide connection between the rear inner surfaces of all C2-C7 vertebrae.
PLL ligament (19) is positioned to provide connection between the front inner surfaces of all C2-C7 vertebrae.
ISL ligament (20) is positioned to provide connection between the rear bottom-top surfaces of the consecutive vertebrae in all C2-C7 vertebrae.

Figure 7:
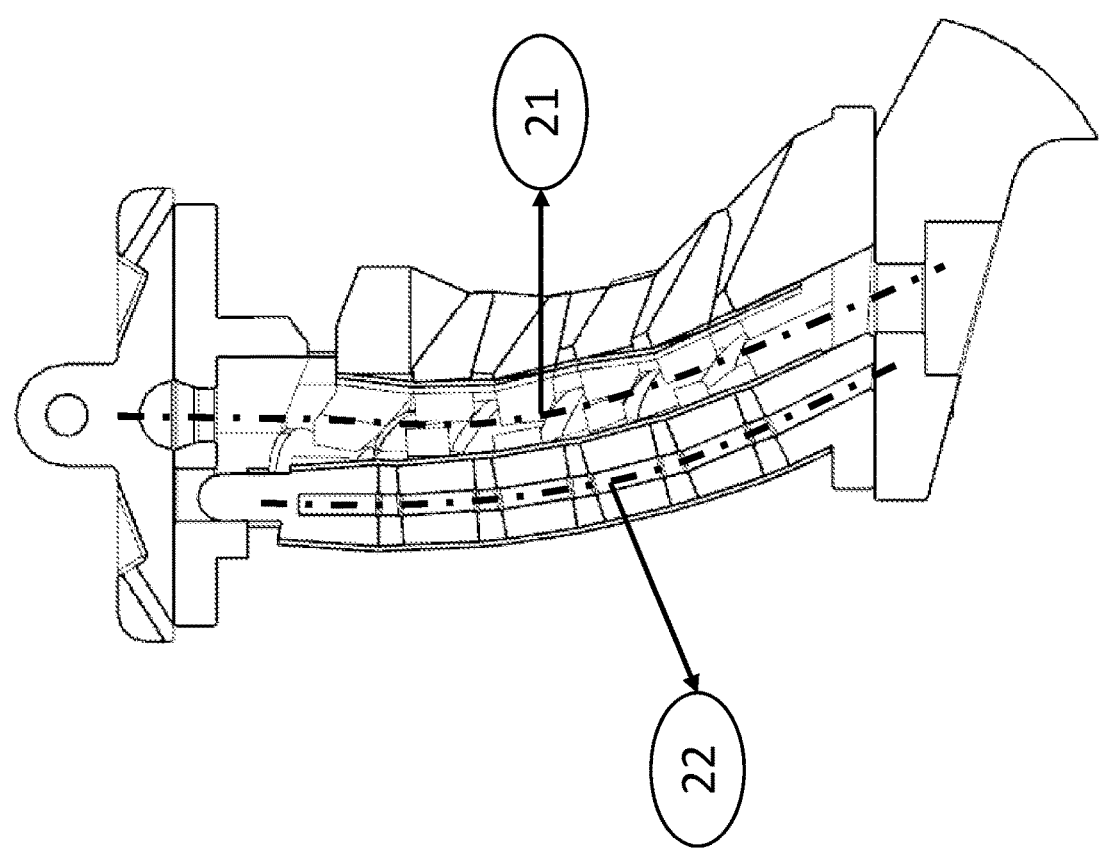
FIG. 7 shows a neck muscle interface 1 and 2 of the neck model of the invention
Figure 8:
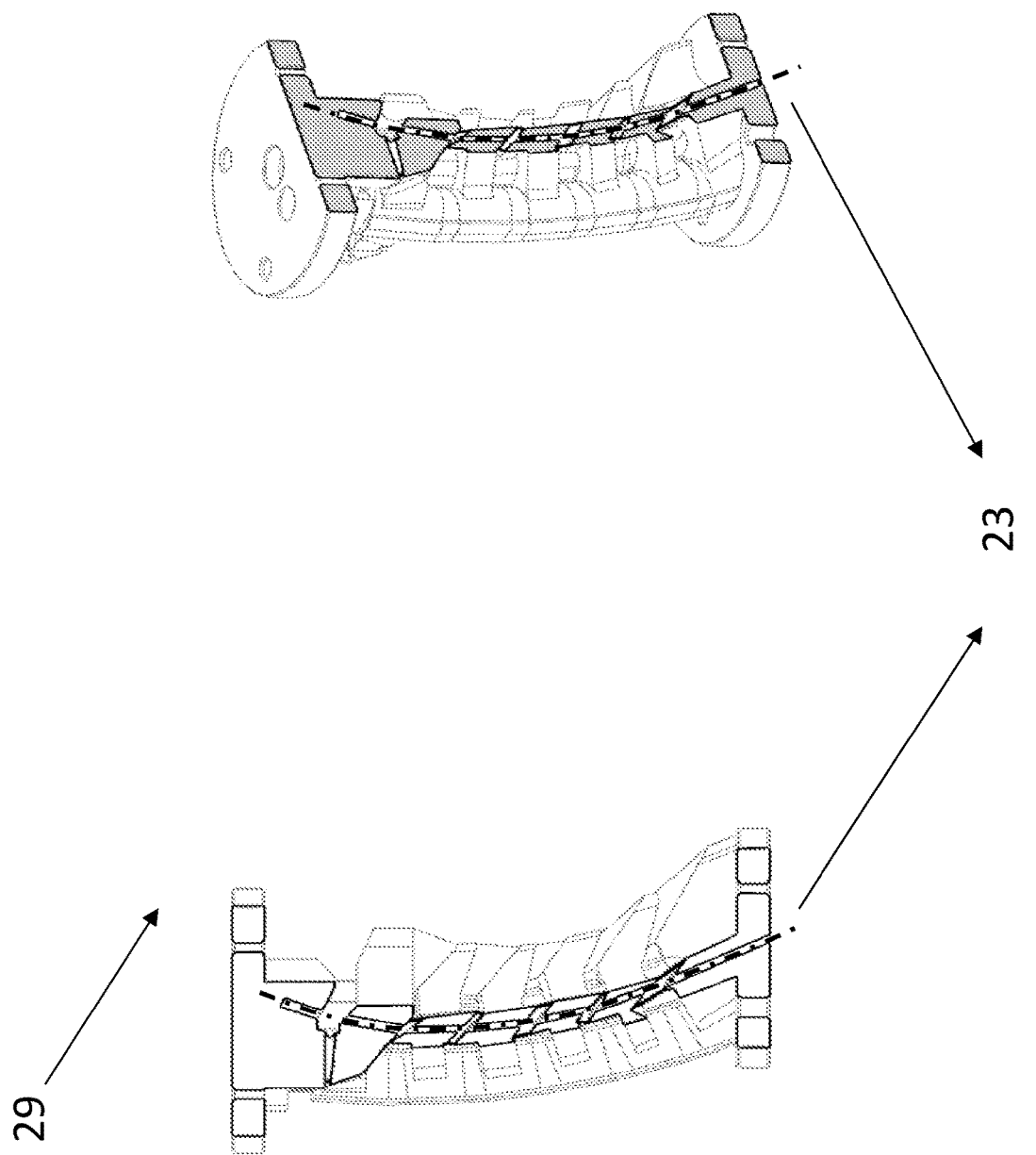
FIG. 8 shows a neck muscle, left muscle interface of the neck model of the invention
Figure 10:
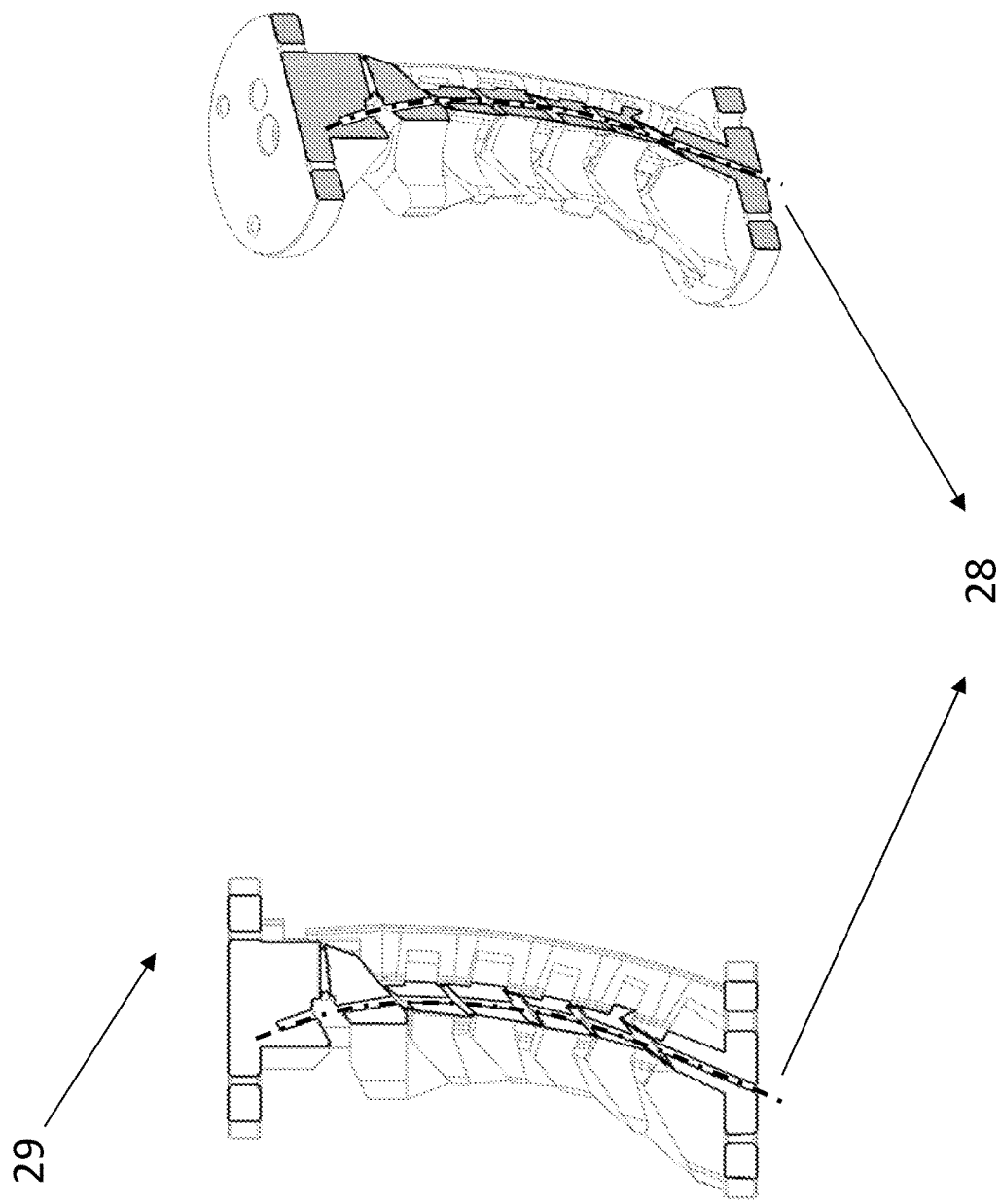
FIG. 10 shows a neck muscle, right muscle interface of the neck model of the invention

In FIGS. 7, 8 and 10, the muscle interfaces (21-23 and 28) of the neck model (29) are shown. The muscles of the human neck are modeled by leaving cylindrical hole shaped interfaces (21-23 and 28) inside the components used in the neck model (29) of the invention. In the neck model (29) of the invention, steel ropes, high stiffness nylon ropes, rubber rods or composite rods are used for muscles that pass through the muscle interfaces (21-23 and 28).

Figure 13:
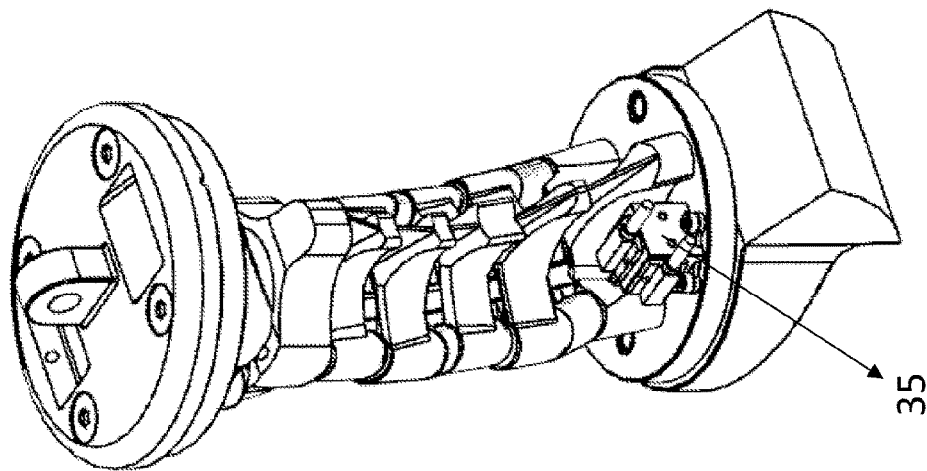
FIG. 13 shows a rear perspective view of the neck model with installed sensors
Figure 12:
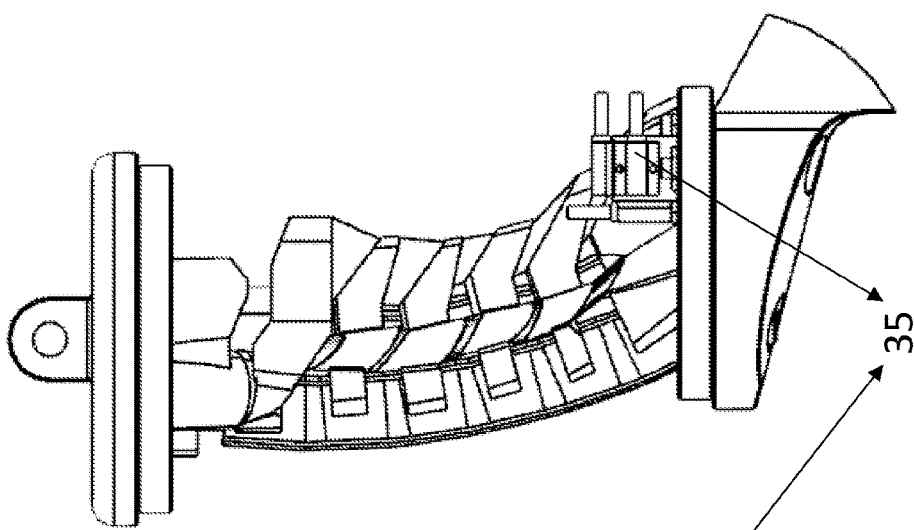
FIG. 12 shows a side view of the neck model with installed sensors
Figure 11:
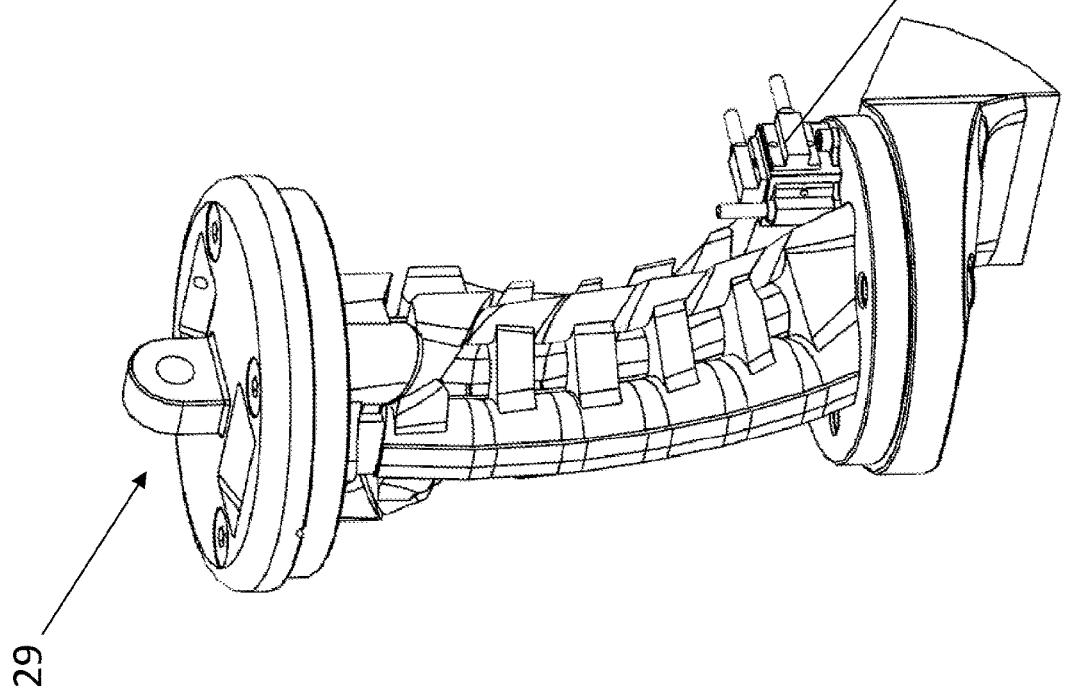
FIG. 11 shows a front perspective view of the neck model with installed sensors
Figures 14, 15:
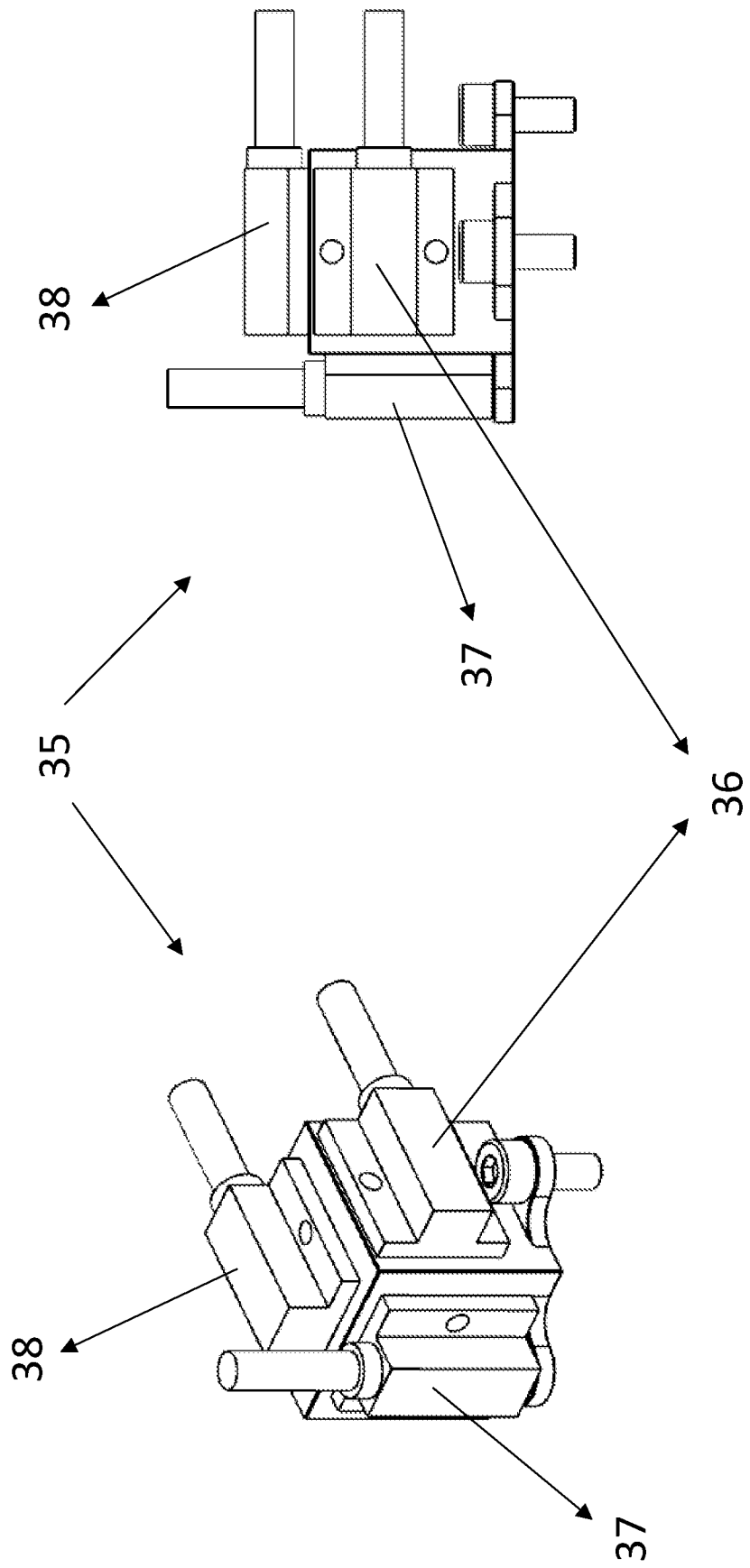
FIG. 14 shows a perspective view of the sensor set
FIG. 15 shows a side view of the sensor set
Figure 18:
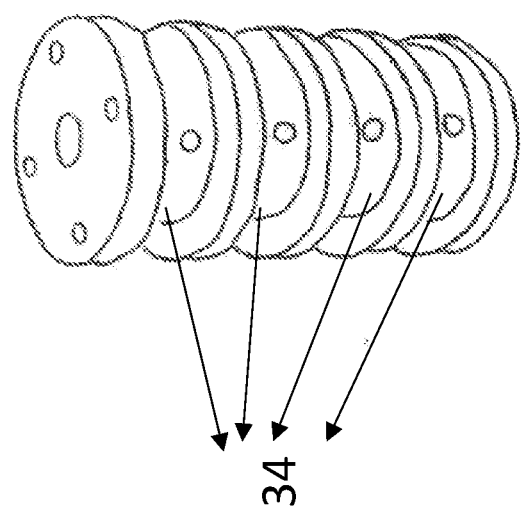
FIG. 18 shows Hybrid III Dummy neck intervertebral discs (Prior Art)
Figure 17:
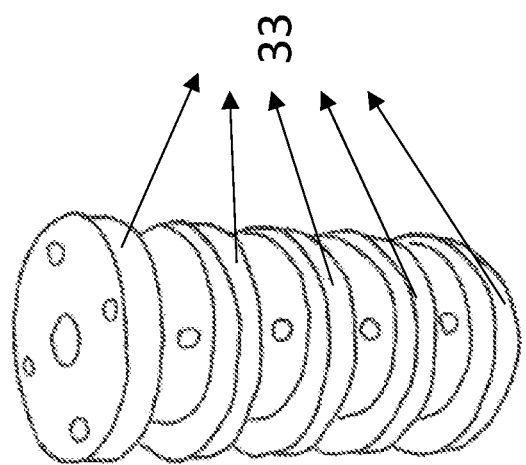
FIG. 17 shows Hybrid III Dummy neck vertebrae (Prior Art)
Figure 16:
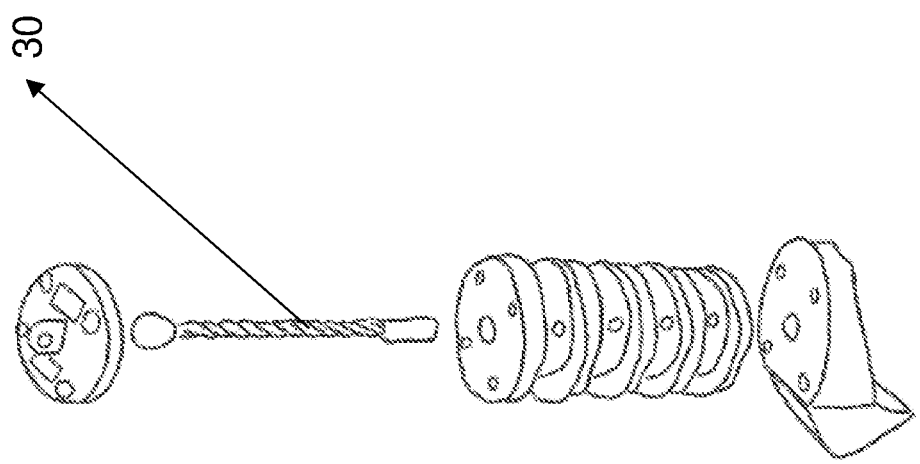
FIG. 16 shows Hybrid III Dummy neck model (Prior Art)
Figure 20:
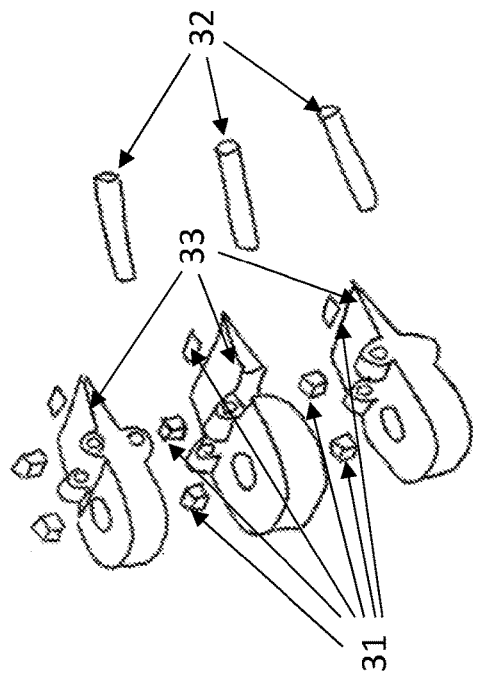
FIG. 20 shows BioRID II Crash Test Dummy neck intervertebral limiters (Prior Art)
Figure 21:
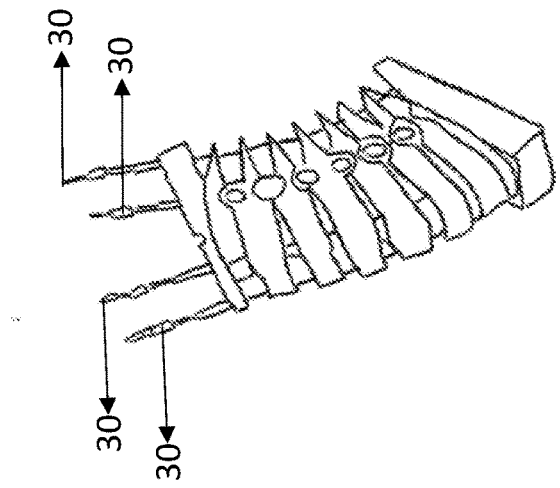
FIG. 21 shows BioRID II Crash Test Dummy neck muscle structure (Prior Art)
Figure 19:
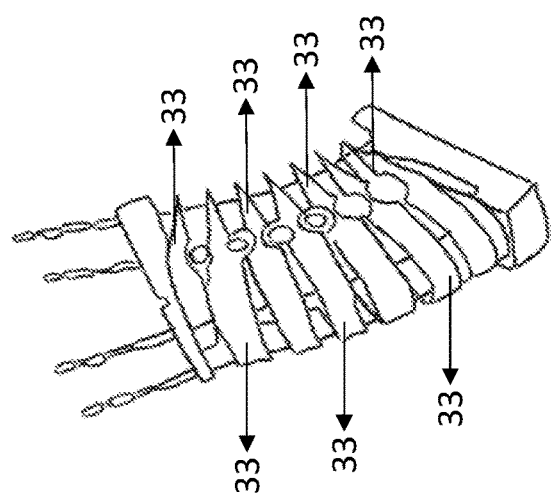
FIG. 19 shows BioRID II Crash Test Dummy neck vertebrae (Prior Art)
Figure 23:
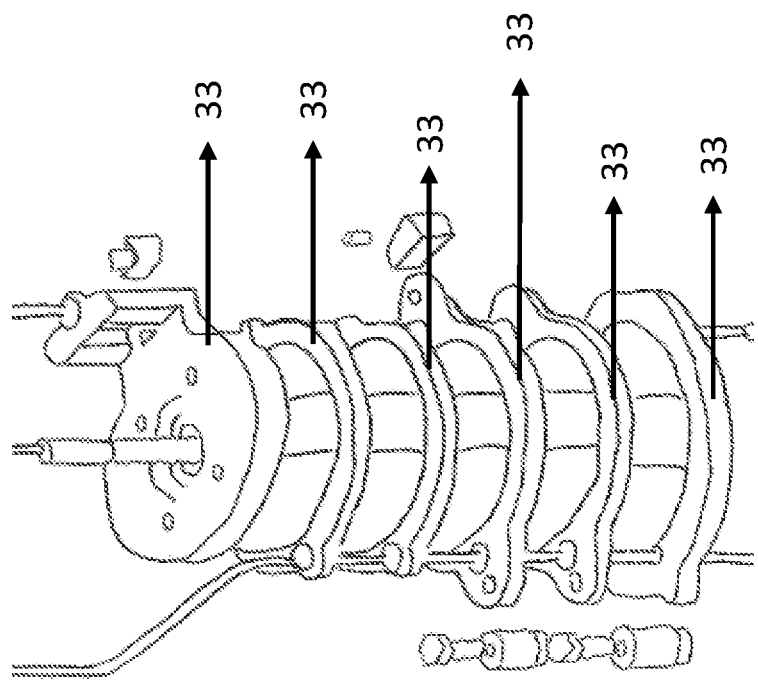
FIG. 23 shows THOR-50M Crash Test Dummy neck vertebrae (Prior Art)
Figure 22:
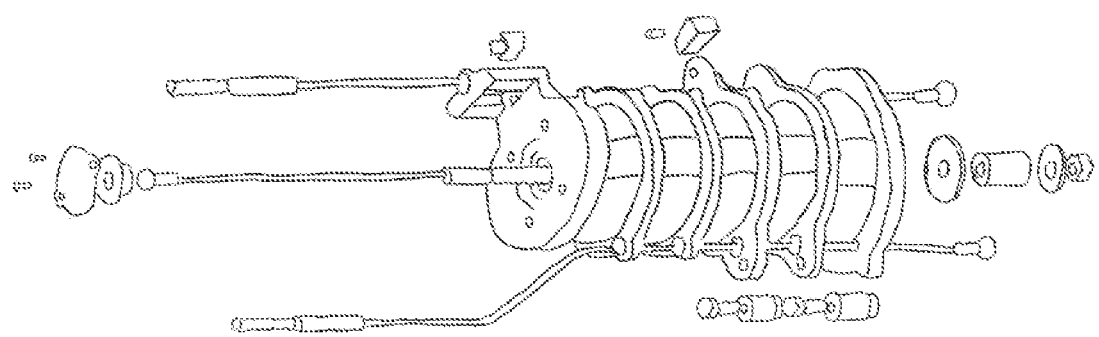
FIG. 22 shows THOR-50M Crash Test Dummy three-dimensional neck model (Prior Art)
Figure 25:
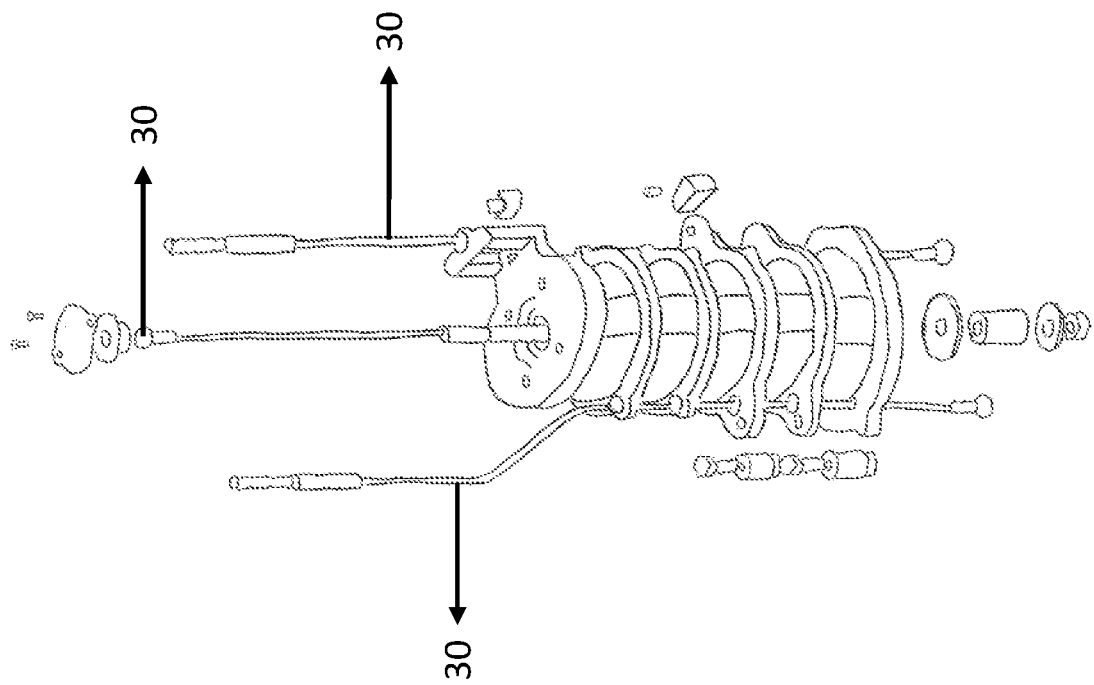
FIG. 25 shows THOR-50M Crash Test Dummy neck muscle structure (Prior Art)
Figure 24:
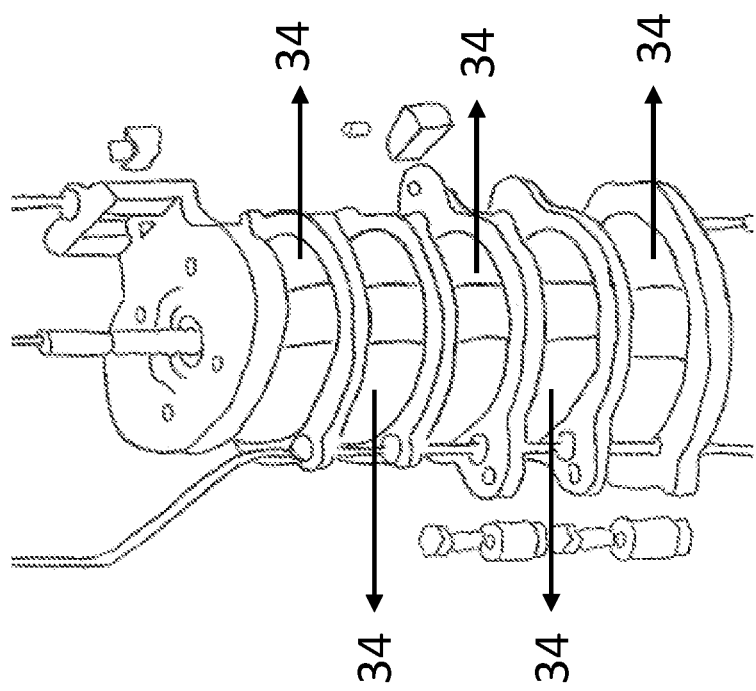
FIG. 24 shows THOR-50M Crash Test Dummy neck intervertebral discs (Prior Art)

In addition, various sensors are placed on the neck model for performing neck injury analysis on the suggested neck model (29) in the invention. During crash tests, data is collected from both the head of the dummy and directly from the suggested neck model. Acceleration data is collected by a three-axis accelerometer (x, y, z axes) located exactly on the center of mass of the head of the dummy. Moreover, as seen in FIGS. 11-13, a set of sensors (35) are positioned on the C7 neck vertebra located at the bottom of the neck model (29) of the invention. This sensor set consists of 3 sensors. These are one x-axis accelerometer (37) and one z-axis accelerometer (38) to measure the acceleration in x and z axes and one angle rate sensor (36) to detect the angular motion of the head. The collected data are used in the analysis and evaluation of the neck injuries.

In the invention, a new neck model (29) that can be installed on Hybrid III series dummies is created where all neck injuries and particularly the "whiplash" neck injuries can be examined. Said new model (29) is an original model and it is possible to implement the model (29) to dummies of various sizes by scaling. The new model (29) is a realistic model that is geometrically very close to the human neck. The materials are selected by considering the realistic data obtained by the tests performed on cadavers. Unlike the unrealistic stiff neck behavior of the current dummies, our invention provides a realistic neck behavior closer to humans.

Figure 9:
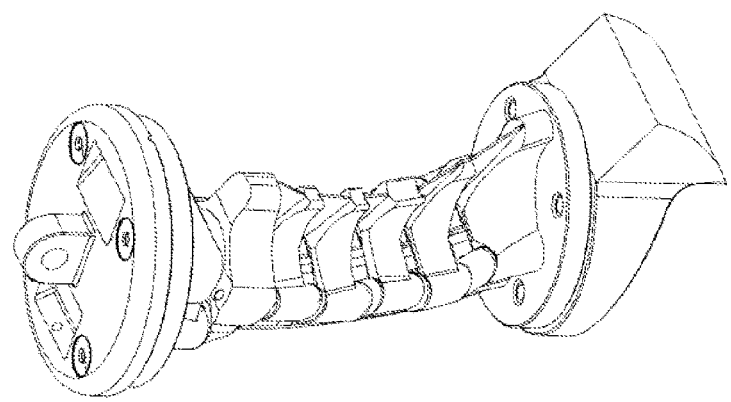
FIG. 9 shows views from various angles of the neck model of the invention
Figure 9:
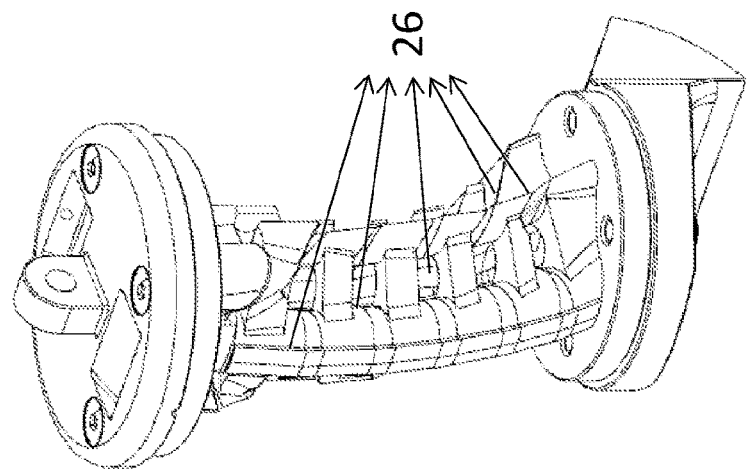
Figure 9:
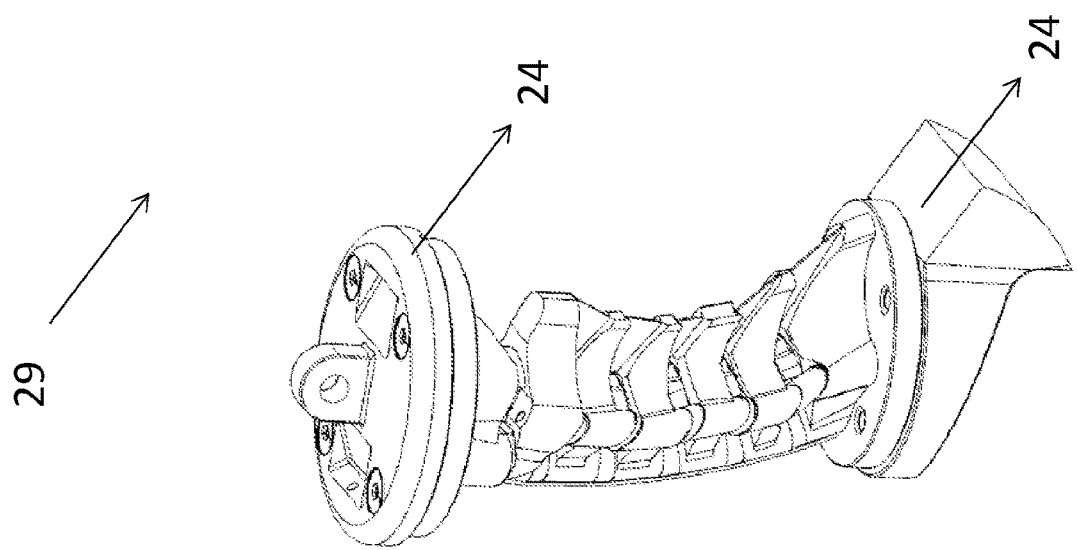

FIG. 9 shows the neck model (29) of the invention from various angles. The neck model (29) consists of a number of interface components (24), five intervertebral discs (8-12), intervertebral discs (8-12) and eight types of ligaments (13-20 as shown in FIGS. 3-6 and 26 as shown in FIG. 9) that provides connection between the vertebrae (1-7), seven vertebrae (1-7) and four muscle interfaces (21-23 and 28) and at least one set of sensors (35) shown in FIGS. 11-15. During construction of the model (29), 3-dimensional vertebral data created by computerized tomography scan of a real cadaver and geometrical and material data of the soft tissues presented in the literature are used. The vertebrae (1-7) that are present in the model (29) represent the bone tissue i.e. vertebrae of the human neck, the ligaments (13-20 and 26) and the intervertebral discs (8-12) represent the soft tissues that connect the vertebrae of the human neck (1-7), muscle interfaces and muscle elements (21, 23 and 28) represent the muscle tissues that provide stiffness to the neck of a human. The connection interface components (24) enable installation of the model (29) to the current crash test dummies. The connection interface components (24) can be changed and are used for different dummy types.

In the invention, silicon and/or epoxy adhesives are used to connect the vertebrae (1-7), the intervertebral discs (8-12) and the ligaments (13-20 as shown in FIGS. 3-6 and 26 as shown in FIG. 9) which forms the assembly. By using said adhesives, the vertebrae (1-7), the intervertebral discs (8-12) and the ligaments (13-20 and 26) are bonded over surfaces where they contact each other. Thus, the integrated neck model (29) shown by various angles in FIGS. 3-6 and 9 is obtained.

The invention claimed is:
1. A new physical neck model where all neck injuries and particularly the "whiplash" neck injuries are examined for "adult crash test dummies" used in vehicle crash tests in the vehicle safety field, comprises:
a number of connection interface components, wherein the number of connection interface components are configured for installation of the neck model to a crash test dummy;
five intervertebral discs, wherein the five intervertebral discs are positioned between vertebra 3 and vertebra 7;
seven vertebrae, wherein the seven vertebrae are modeled based on scanned human cadaver data, and wherein the five intervertebral discs and eight types of ligaments connect the seven vertebrae with each other;

four muscle interfaces, wherein the four muscle interfaces are formed as a plurality of cylindrical holes inside the elements used in the neck model and the four muscle interfaces provide stiffness to a neck by a plurality of muscles passing therein; and at least one sensor set installed on a bottom neck vertebra of the neck model in order to collect physical data of a collision and to detect a plurality of loads acting on the neck model.

2. The new physical neck model according to claim 1, wherein the seven vertebrae are made of aluminum AL 5083 H111 forged material.

3. The new physical neck model according to claim 1, wherein the seven vertebrae are made of magnesium EA55RS forged material.

4. The new physical neck model according to claim 1, wherein the five intervertebral discs are modeled based on the data present in a literature and the current scanned vertebral data.

5. The new physical neck model according to claim 1, wherein the five intervertebral discs are not positioned between vertebra 1 and vertebra in the neck model to make the five intervertebral discs closer to the human body.

6. The new physical neck model according to claim 1, wherein the five intervertebral discs are made of butyl/halo butyl rubber comprising Isobutylene isoprene rubber IIR, a 30-50% carbon black material.

7. The new physical neck model according to claim 1, wherein the five intervertebral discs are made of natural rubber, a 15-42% carbon black material.

8. The new physical neck model according to claim 1, wherein eight types of ligaments are modeled based on the data present in a literature and the currently scanned vertebral data.

9. The new physical neck model according to claim 1, wherein an internal structure of a capsular ligament CL forms a plurality of facet joints.

10. The new physical neck model according to claim 1, wherein a capsular ligament CL located on the bottom neck vertebra of the neck model is made of silicon comprising Vinyl Methyl Silicon VMQ, a heat cured material.

11. The new physical neck model according to claim 1, wherein a capsular ligament CL located on the bottom neck vertebra of the neck model is made of fluorosilicon FVMQ, a heat cured material.

12. The new physical neck model according to claim 1, wherein a posterior atlanto-axial membrane PAAM on a upper neck vertebra of the neck model is made of butyl/halo butyl rubber comprising Isobutylene isoprene rubber IIR, a non-reinforced material.

13. The new physical neck model according to claim 1, wherein a posterior atlanto-axial membrane PAAM on the upper neck vertebra of the neck model is made of silicon comprising Vinyl Methyl Silicon VMQ, a heat cured and low hardness material.

14. The new physical neck model according to claim 1, wherein a transverse ligament TL on the upper neck vertebra of the neck model is made of silicon comprising Vinyl Methyl Silicon VMQ, a heat cured material.

15. The new physical neck model according to claim 1, wherein a transverse ligament TL on the upper neck vertebra of the neck model is made of fluorosilicon FVMQ, a heat cured material.

16. The new physical neck model according to claim 1, wherein an anterior longitudinal ligament ALL on the bottom neck vertebra of the neck model is made of silicon comprising Vinyl Methyl Silicon VMQ, a heat cured material.

17. The new physical neck model according to claim 1, wherein an anterior longitudinal ligament ALL on the bottom neck vertebra of the neck model is made of butyl/halo butyl rubber comprising Isobutylene isoprene rubber IIR, a 30-50% carbon black material.

18. The new physical neck model according to claim 1, wherein a ligamenta flava LF on the bottom neck vertebra of the neck model is made of silicon comprising Vinyl Methyl Silicon VMQ, a heat cured material.

19. The new physical neck model according to claim 1, wherein a ligamenta flava LF on the bottom neck vertebra of the neck model is made of butyl/halo butyl rubber comprising Isobutylene isoprene rubber IIR, a 30-50% carbon black material.

20. The new physical neck model according to claim 1, wherein a posterior longitudinal ligament PLL on the bottom neck vertebra of the neck model is made of silicon comprising Vinyl Methyl Silicon VMQ, a heat cured material.

21. The new physical neck model according to claim 1, wherein a posterior longitudinal ligament PLL located on the bottom neck vertebra of the neck model is made of fluorosilicon FVMQ, a Fluorosilicon heat cured material.

22. The new physical neck model according to claim 1, wherein an interspinous ligaments ISL on the bottom neck vertebra of the neck model is made of butyl/halo butyl rubber comprising Isobutylene isoprene rubber IIR, a non-reinforced material.

23. The new physical neck model according to claim 1, wherein an interspinous ligaments ISL on the bottom neck vertebra of the neck model is made of acrylic rubber ACM, a 30-40% carbon black material.

24. The new physical neck model according to claim 1, wherein an anterior atlanto-axial membrane AAAM is positioned to provide connection between the front, bottom, and top surfaces of the C1 and C2 vertebrae.

25. The new physical neck model according to claim 1, wherein a capsular ligament CL is positioned to provide connection between the bottom, top surfaces of the right and left parts of the consecutive vertebrae in all the C1-C7 vertebrae.

26. The new physical neck model according to claim 1, wherein a posterior atlanto-axial membrane PAAM is positioned to provide connection between the rear bottom, top surfaces of the C1 and C2 vertebrae.

27. The new physical neck model according to claim 1, wherein a transverse ligament TL is positioned to provide connection between the front inner surfaces of the C1 and C2 vertebrae.

28. The new physical neck model according to claim 1, wherein an anterior longitudinal ligament ALL is positioned to provide connection between the front surfaces of all the C1-C7 vertebrae.

29. The new physical neck model according to claim 1, wherein a ligamenta flava LF is positioned to provide connection between the rear inner surfaces of all the C2-C7 vertebrae.

30. The new physical neck model according to claim 1, wherein a posterior longitudinal ligament PLL is positioned to provide connection between the front inner surfaces of all the C2-C7 vertebrae.

31. The new physical neck model according to claim 1, wherein an interspinous ligaments ISL is positioned to provide connection between the rear bottom-top surfaces of the consecutive vertebrae in all the C2-C7 vertebrae.

32. The new physical neck model according to claim 1, wherein the plurality of muscles passing through the four muscle interfaces are made by one of: a plurality of steel ropes, high stiffness nylon rubber, rubber rods, or composite rods.

33. The new physical neck model according to claim 1, wherein the at least one sensor comprises one X-axis accelerometer to measure an acceleration along X-axis.

34. The new physical neck model according to claim 1, wherein the at least one sensor comprises one Z-axis accelerometer to measure an acceleration along Z-axis.

35. The new physical neck model according to claim 1, wherein the at least one sensor comprises one angle rate sensor to detect an angular motion of a head during collision.

36. The new physical neck model according to claim 1, comprising a structure, wherein the structure is implemented to a plurality of dummies with various size and collision directions by being scaled and by changing the number of connection interface components.

37. The new physical neck model according to claim 1, wherein silicon or epoxy adhesives are used on a plurality of surfaces where the seven vertebrae, the five intervertebral discs and the eight types of ligaments are in contact with each other in the connection.

* * * * *